(12) United States Patent
Gross

(10) Patent No.: US 8,521,580 B2
(45) Date of Patent: Aug. 27, 2013

(54) TARGETING PROMOTIONAL ELECTRONIC COUPONS BASED ON USER ITEM SAMPLING RATINGS

(71) Applicant: John Nicholas Gross, Berkeley, CA (US)

(72) Inventor: John Nicholas Gross, Berkeley, CA (US)

(73) Assignee: The John Nicholas and Kristin Gross Trust, Berkeley, CA (US)

( * ) Notice: Subject to any disclaimer, the term of this patent is extended or adjusted under 35 U.S.C. 154(b) by 0 days.

(21) Appl. No.: 13/651,279

(22) Filed: Oct. 12, 2012

(65) Prior Publication Data

US 2013/0041754 A1 Feb. 14, 2013

Related U.S. Application Data

(63) Continuation of application No. 12/335,247, filed on Dec. 15, 2008, now Pat. No. 8,321,261.

(60) Provisional application No. 61/013,943, filed on Dec. 14, 2007, provisional application No. 61/020,484, filed on Jan. 11, 2008, provisional application No. 61/043,363, filed on Apr. 8, 2008.

(51) Int. Cl.
*G06Q 10/00* (2012.01)
*G06Q 30/00* (2012.01)
*G06Q 20/00* (2012.01)
*G06Q 50/00* (2012.01)

(52) U.S. Cl.
USPC ............................ 705/7.32; 705/14.1; 705/15

(58) Field of Classification Search
USPC ......................................... 705/15, 7.32, 14.1
See application file for complete search history.

(56) References Cited

U.S. PATENT DOCUMENTS

| 5,090,734 | A | * | 2/1992 | Dyer et al. ....................... 283/67 |
| 5,562,112 | A | * | 10/1996 | Gunderman et al. ......... 132/333 |
| 5,566,693 | A | * | 10/1996 | Gunderman et al. ......... 132/333 |
| 6,641,037 | B2 | | 11/2003 | Williams |
| 7,334,728 | B2 | | 2/2008 | Williams |
| 7,593,863 | B1 | | 9/2009 | Sunshine et al. |
| 7,693,752 | B2 | * | 4/2010 | Jaramillo ..................... 705/26.9 |
| 7,797,191 | B2 | | 9/2010 | Cotten et al. |
| 7,881,960 | B2 | | 2/2011 | Ramamurti |
| 8,229,458 | B2 | * | 7/2012 | Busch ......................... 455/456.1 |
| 8,254,894 | B2 | | 8/2012 | Cortegiano et al. |
| 2002/0029184 | A1 | | 3/2002 | Reiner |
| 2002/0147766 | A1 | * | 10/2002 | Vanska et al. ................. 709/203 |
| 2003/0216970 | A1 | | 11/2003 | Vadjinia |
| 2004/0243472 | A1 | | 12/2004 | Vadjinia |

(Continued)

OTHER PUBLICATIONS www.wineparty.com; http://web.archive.org/web/20051111 091024/www.wineparty.com/wpDemo01.htm, 2005, 1 page.

(Continued)

*Primary Examiner* — Seye Iwarere
(74) *Attorney, Agent, or Firm* — PatentBest; Andrew McAleavey

(57) ABSTRACT

Items—including gourmet products—are evaluated and rated by participants in a controlled event, which can be coordinated by software locally or at a dedicated website. Event data, including item scores and participant scores can be shared with vendors, merchants and other commercial entities associated with the products. Promotional incentives from such entities for the products (and related products) can then be directly targeted and provided to participants and other members of the public. The participant's activities can also be collected and disseminated to affiliates/friends of the participants through social networking sites, personalized web pages, etc.

20 Claims, 9 Drawing Sheets

(56) References Cited

U.S. PATENT DOCUMENTS

| | | |
|---|---|---|
| 2005/0055281 A1 | 3/2005 | Williams |
| 2006/0179045 A1 | 8/2006 | Grinsfelder et al. |
| 2006/0179055 A1 | 8/2006 | Grinsfelder et al. |
| 2007/0161382 A1* | 7/2007 | Melinger et al. ............ 455/456.1 |
| 2007/0299724 A1* | 12/2007 | Hales et al. ...................... 705/14 |
| 2008/0140520 A1* | 6/2008 | Hyder et al. ..................... 705/14 |
| 2008/0275761 A1 | 11/2008 | Seifer et al. |
| 2009/0077057 A1 | 3/2009 | Ducheneaut et al. |
| 2009/0089158 A1* | 4/2009 | Noll et al. ....................... 705/14 |
| 2009/0210321 A1 | 8/2009 | Rapp |
| 2010/0305730 A1* | 12/2010 | Glitsch et al. ................... 700/94 |

OTHER PUBLICATIONS

Dave Shulman; "The Lime Barty Story," LA Weekly Columns, Oct. 27, 1999, 3 pages.

www.wineparty.com; http://web.archive.org/web/20051111094142/www.wineparty.com/wpOrderSW.htm, 2005, 1 page.

www.wineparty.com; http://web.archive.org/web/200508040256111http:/www.wineparty.com/, 2005, 1 page.

Orley Ashenfelter and Richard E. Quandt, "Analyzing a Wine Tasting Statistically", Feb. 24, 2006 http://web.archive.org/web/20060224174349/http://www.liquidasset.com/tasting.html[May 1, 2012 12:11:38 AM].

* cited by examiner

*Fig. 4A*

WINE PARTY EVENT SET UP

Party host: Mr. X　　　　　Date/Time of event: 12/31/07 8 p.m.　　　　　Location: xxx St, SF, CA Event type: Cabernet tasting　　　Event ID: 999-88　　　Kit ID:CAB01 (see more details)

Participant Count:　　Participant Response Status:　　xx Confirmed Yes
　　　　　　　　　　　　　　　　　　　　　　　　　　xx Confirmed No
　　　　　　　　　　　　　　　　　　　　　　　　　　xx Maybe
　　　　　　　　　　　　　　　　　　　　　　　　　　xx No Response Event Details:
　Conducted by:　　　Wine Party ___　Party Host ___ (see more details)
　Wine supplied by:　Wine Party ___　Party Host ___
　Open or blind tasting: ___　Provide labels? y/n ___
　Data to be collected: Ratings y/n ___　Predictions y/n ___　Profiles: y/n ___
　Presentation mode: Promos: y/n ___
　Game/Competitions: Between participants ___　Expert Challenge Mode ___
　Event results:　Publish to participants ___　Share with Vendors ___
　Prize types:　Coupons ___　Other ___
　Send Reminders:　By email ___　By IM ___　By phone: ___
　Send Preview: Y/N　By email ___　By IM ___　By regular mail ___
　Food selected: y/n　Type: ___

| Manage Participants 411 | | Manage Item Sampling Kit 413 |
| Manage Event Details 412 | | My Account 414 |

Wine Party Event

My name: Mr. Y

Wine ID #: 7

My rating: 7.5 out of 10

431

Rating that my significant other will give: 8.0

Rating that the Connoisseurs gave to it: 8.0

Other adjectives to describe this wine: fruity

Wine Party Results

Wine ID #: 7          Real Name of Wine: ABC Cabernet 2001

Total Ratings Score: 7.3    Median:    Standard Deviation:    — 441

Placement relative to other wines: 3rd out of 10

Predicted Ratings for others: 7.6          Predicted Ratings for Connoisseurs: 7.0

Other adjectives to describe this wine: fruity

PROMOTIONAL MULTIMEDIA PRESENTATION
BY VENDOR OF ABC CABERNET

442

If you liked this wine, you will also probably like:
ABC Cabernet 2002
XYZ Zinfandel 2003
JKL Zinfandel 2004          443

*Click here if you would like to receive discounts or other promotions for this wine or winery*
444

440

TARGETING PROMOTIONAL ELECTRONIC COUPONS BASED ON USER ITEM SAMPLING RATINGS

RELATED APPLICATIONS

The present application is a continuation of U.S. patent application Ser. No. 12/335,247, filed Dec. 15, 2008. That application claims the benefit under 35 U.S.C. 119(e) of the priority date of the following: Provisional Application Ser. Nos. 61/013,943 filed Dec. 14, 2007; 61/020,484 filed Jan. 11, 2008; and 61/043,363 filed Apr. 8, 2008. All of those applications are hereby incorporated by reference in their entireties.

FIELD OF THE INVENTION

The present invention relates to gourmet food/drink entertainment events and e-commerce and recommendation support systems used and/or associated therewith.

BACKGROUND

Wine tastings are popular events that are enjoyed both on a commercial and non-commercial basis. At the one extreme, various organizations are known to put on large scale events to rate vintages offered by different wine labels, and sometimes these events are open to the public for their enjoyment as well. These festivals are extremely popular and attract large crowds interested in wines. Individual wineries also offer tastings of their products on a small scale for the benefit of visitors. These functions allow wineries to collect data directly from consumers on the likeability of different types of wine.

Finally, at the public level, so-called private "wine tasting parties" represent yet another form of entertainment and enjoyment that is popular at this time. At such functions, individuals are invited to taste, discuss and rate wines as part of the social activities. Such parties are becoming more commonplace, but the wineries and other vendors associated with such products have not been able to tap into the information exchanged at such events.

There are some Internet/e-commerce entities also dedicated to wine and related products. For example a website identified as www.winelog.net is dedicated to wine lovers and includes a tool for members to enter their wine ratings and receive recommendations. Winelog describes itself as an "online community of wine drinkers." The limitation of this site is that it caters only to persons who have taken the time to find the site and have registered specifically as members. This tends to restrict the community to hard core oenophiles. Moreover it does not appear to coordinate and tie together the collected ratings data for wine growers, consumers and merchants of such products. Consequently the user population and popularity of such system does not appear to be significant.

Thus techniques for collecting data for food/drink preferences have been rather limited. It would be preferable if there were some manner of increasing the participation rate in the general public to enhance knowledge of consumer preferences.

SUMMARY OF THE INVENTION

An object of the present invention, therefore, is to overcome and/or reduce the aforementioned limitations of the prior art.

A first aspect of the invention concerns a method of conducting a sampling event for items comprising: (a) providing one or more electronic data collection devices; (b) collecting at least a set of ratings for the set of items from a group of participants using a first routine executing on the one or more electronic data collection devices during the item sampling event; (c) calculating item sampling event data including at least item scores and participant scores using a second computing routine; (d) providing at least some of the item sampling event data through a network to one or more electronic computing systems associated with third parties involved in the making, distributing and/or selling of the items; and (e) receiving promotional coupons and/or other electronic feedback from such third parties at the one or more electronic data collection devices or other electronic message accounts associated with the group of participants. The promotional coupons and/or other electronic feedback are preferably coupled and dynamically adjustable based on a geographical location of the one or more data collection devices and/or a residence address of the group of participants.

In preferred embodiments the one or more electronic data collection devices include a single phone based computing device which is adapted to present a data capture interface which varies for multiple users. Additional steps such as (b)': receiving prediction data from the participants concerning the expected ratings to be provided by other participants for one or more of the items; and/or receiving prediction data from the participants concerning the actual ratings provided by experts for one or more of the items can also be implemented.

The method further preferably includes a step: determining one or more participant winners based on an overall group participant rating provided to items submitted by such participants. Additional steps of computing a rating and participant correlation score can be done to determine at least one or more of the following:
 a. which pair of participants provided the closest ratings results;
 b. which pair of participants provided the most disparate ratings results;
 c. which identified couple in the group provided the closest ratings data;
 d. which identified couple in the group provided the most disparate ratings data;
 e. a deviation from aggregate group scores on a participant by participant basis;
 f. one or more participants who subjectively gave the lowest rating to the item rated highest by the group;
 g. one or more participants who gave the highest rating to the item rated lowest by the group;
 h. one or more participants who gave the lowest rating to the item rated lowest by the group;
 i. one or more participants who gave the highest rating to the items rated highest by the group;
 j. a score of each item broken down by sex or age groups.

In some embodiments the following additional steps can also be optionally included:
 presenting advertising to the participants electronically through the one more electronic data collection devices during the sampling event, which advertising is related to the items and/or items correlated to the items can be done:
 compiling ratings and other event data for one or more the participants and presenting the same to websites for which the participants have social networking memberships;
 automatically identifying a nearest location for each of the participants on the one or more data collection devices for purchasing one or more of the items;

deriving the sampling data in part from kit data associated with a predetermined item sampling kit containing the set of items and associated identification information—the set of items can be packaged in a manner to obscure their identity and/or origin to the group of participants;

configuring the electronic data collection devices to communicate directly to a restaurant or bar computing system through a network;

configuring the electronic data collection devices to automatically capture identification information from the set of items—wherein the identification information includes one of: a barcode, an image, an alphanumeric label, and/or a radio frequency (RF) identification;

capturing the set of ratings with a speech recognition system;

predicting one or more items of interest to at least some of the participants based on a collaborative filtering and/or a corroborative filtering analysis;

monitoring redemptions of the participants of the promotional coupons.

determining which one or more of the participants provide(s) ratings best correlating to prior scores given by other participants in other sampling events;

presenting electronic dynamically to the participants during the event;

registering the item sampling event with a centralized computing system accessible at one more item vending establishments, and wherein the centralized computing system monitors and tracks purchases made by participants for the event to prevent duplication and provide recommendations to such participants;

coupling the one or more electronic data collection devices during the item sampling event to provide common updates to each such device; wherein one of the one or more electronic data collection devices is configured as a master for conducting the item sampling event and coordinating data collection from the other electronic data collection devices;

allowing the participants to be located at disparate geographic locations;

providing recommendations for different types of items;

presenting an output of results of the item sampling event to the participants in text or graphical form;

providing ongoing alerts of promotional events for the items are provided to participants—wherein the ongoing alerts are optionally triggered in part by a correlation of a physical location of a participant to a physical location of a merchant or other entity associated with the promotional event.

Another aspect of the invention concerns a method of marketing and promoting items comprising the steps: a) providing an item marketing computing system which is coupled through a network connection to a first item manufacturer computing system, a second item distributor computing system, and a third item data collection computing system; the item marketing computing system including one or more software routines to perform the following operations: 1) coordinating communication of first item event data to the third item data collection computing system from a group of participants sampling a first item; 2) calculating scores for the first item and/or for the group of participants; 3) communicating the scores and/or the first item event data to at least the first manufacture computing system; 4) process feedback data based on the scores and/or the first item event data from the first manufacture computing system and/or the second item distributor computing system which is specific to at least one or more the group of participants; 5) communicating promotional information to the third item data collection computing system relevant to the first item, and/or items determined to be related to the first item to the at least one or more of the group of participants.

The promotional information is presented dynamically from a manufacturer and/or distributor of the first item to a participant during the item sampling event and which promotional information is responsive and related to scores provided by the participant and/or other participants in the sampling event. The item sampling event is preferably associated with tasting a food or beverage, and the items are preferably wine.

Yet another aspect of the invention concerns an item data sampling collection computing device comprising: an electronic interface for capturing item sampling data from a participant for a set of items in an item sampling event; an item sampling processing routine that is adapted to: communicate at least some of the item sampling data with a remote computing system; present feedback data from the remote computing system, including advertising and/or promotional coupons for items, which feedback data is derived at least in part from a recommender system and is customized for one or more participants in the item sampling event; calculate scores and awards for the one or more participants based on evaluating and correlating their respective ratings provided on the set of items sampled during the item sampling event.

In some embodiments the device is part of a fixed electronic kiosk situated in a commercial establishment that serves food and/or beverages.

In a preferred embodiment the device is further adapted as a master controller of the item sampling event, such that the device communicates to other slave data collection devices operated by other participants and collects the item sampling data from such slave data collection devices. The device communicates directly to at least some of the slave data collection devices by way of a wireless connection. It can also communicate to the slave data collection devices through an intermediary server computing system.

Still in a preferred embodiment the device is further adapted with a sensor and associated routine to automatically determine identification and/or origin data for the set of items. The sensor is at least one of an image scanner, an RF sensor, and/or a barcode reader.

In some applications the electronic interface is adapted to be shared the participants during the sampling event and is customized for each participant during an item data capture session for each such participant. This aspect of the invention allows common feedback data to be broadcast to each of the slave collection devices at substantially the same time to permit simultaneous consideration by the participants of such.

In still other applications the promotional electronic coupons are configured to only be active within a first distance of one or more predetermined preferred establishments.

In another aspect of the invention, a data collection system for collecting data from participants in an item sampling event comprises: a portable master controller computing device; one or more portable slave computing devices; wherein each of the master controller computing device and the one or more slave computing devices having an electronic interface for capturing item sampling data from a participant for a set of items in an item sampling event; further wherein the portable master controller computing device is coupled to and controls data collection and data presentation for the item sampling event from the portable slave computing devices; the portable master controller computing device being further adapted with one or more software routines to: calculate scores and awards for the participants based on evaluating and correlating their respective ratings provided on a set of items sampled during the item sampling event; and present feedback data from a remote computing system, including advertising and/or promotional coupons for items, which feedback data is derived at least in part from a recommender system and is customized for one or more participants in the item sampling event. The portable slave computing devices preferably provide profile information automatically for a participant to the portable master computing device.

Another aspect of the invention concerns an integrated sampling event kit for sampling a set of consumable items comprising: an integrated package including at least the following: 1) the set of consumable items; wherein the set of consumable items are packaged in a manner so as to obscure their origin and/or identity from at least some of a group of participants in a sampling event; 2) a storage media including item data stored thereon in electronic form, including identification data for each item in the set of items. The storage media includes data and/or computing instructions adapted to be read by a portable computing device to assist with the sampling event data collection/analysis.

The storage media also preferably includes software routines and/or instructions for coordinating the sampling event, including compiling ratings for the set of consumable items, and determining awards for the group of participants in accordance with a sampling game procedure. Furthermore the storage media also preferably includes software routines and/or instructions for coordinating data exchanges between the portable computing device and a remote computing system which presents recommendation and/or advertising data to the portable computing device which is correlated with the set of consumable items in the integrated package.

A further aspect of the invention concerns a social networking website comprising: one or more social networking web pages and/or data feeds associated with a member of the social networking site; wherein the member can identify a social circle specified by links and/or associations to other member of the social networking site; a compilation routine executing at the social networking site and adapted to receive and process sampling event data for the member; wherein the sampling event data includes at least member event information relating to one of: 1) a set of items; 2) ratings associated therewith provided by the member; 3) scores and/or awards achieved by the member; 4) advertising materials presented to the member; the compilation routine being further adapted to automatically and selectively modify one of at least the one or more web pages and/or data feeds associated with the member and/or other members of the member's social circle based on the member event information.

In preferred embodiments the member can opt in or opt out of the compiling routine, the data feed is an RSS feed, and the sampling event data is compiled in real-time by the social networking site. A recommender routine is also preferably employed to correlate the member to other members, and provide recommendations to the member relating to other members and/or other items predicted to be of interest to the member.

Another aspect of the invention concerns a recommender computing system adapted to provide recommendations on a group of consumable items comprising: a first routine of the recommender computing system being adapted to collect at least a set of ratings for a set of consumable items from a group of participants using one or more electronic data collection devices during an item sampling event; a second routine of the recommender computing system being adapted to calculate correlations based on the set of ratings between at least one of 1) the group of participants and other persons rating the set of consumable items or related items; and/or 2) the set of items including at least item scores and participant scores; and c) a third routine of the recommender computing system being adapted to present recommendations on consumable items to at least some of the group of participants based on the correlations.

In preferred embodiments a fourth routine is used for interfacing and communicating the correlations and/or the recommendations to a social networking site and/or a computing system managed by a vendor of at least some of the set of consumable items. The recommendations preferably are further correlated to a group of establishments located within a first configurable distance from one or more of the group of participants. They can also be dynamically generated for the group of participants based on their physical location at a particular time. The final recommendation can further include an accompanying electronic coupon from a vendor or distributor of a consumable item.

Still another aspect of the invention concerns a method of conducting a contest for sampling items using a computing system comprising: providing a set of one or items to be rated during an item sampling event in which the items are sampled by a group of participants; automatically collecting at set of reference ratings for the set of items from a group of one or more reference raters using the computing system; automatically collecting at least a set of participant ratings for the set of items from the group of sampling participants during the item sampling event using the computing system; calculating participant scores for the item sampling event using the computing system. A winner of the contest is identified by the participant scores that are based on determining a correlation between each sampling participant rating provided for an item, and a corresponding reference rating provided by the one or more reference raters.

In preferred embodiments a participant having an participant rating for an item coming closest to a reference rating for an item is identified as a winner of the contest. Also, the sampling event is preferably controlled such that the participants are provided the set of items in the same sequence, and with a common set of accompanying consumable items to provide a common experience.

The reference ratings are preferably determined from ratings provided by other consumers of the set of items and/or individuals designated as experts. The method can also include one or more optional steps: providing promotional incentives and/or coupons to a subset of the group of participants based on their participant scores; and/or publishing the participant scores to web pages and/or other data feeds associated with the participants.

The event can also be managed through a dedicated event management website. Thus another aspect of the invention is directed to a website including a computing system adapted to conduct a sampling event for a set of items comprising: a first routine executing on the computing system for collecting at least a set of ratings for the set of items from a group of participants using the one or more electronic data collection devices during the item sampling event; a second routine executing on the computing system for calculating item sampling event data including at least item scores and participant scores; a third routine executing on the computing system for providing at least some of the item sampling event data through a network to one or more electronic systems associated with third parties involved in the making, distributing and/or selling of the items; a fourth routine for processing and sending promotional coupons and/or other electronic feedback from such third parties to the one or more electronic data collection devices or electronic accounts for the group of participants. The promotional coupons and/or other electronic feedback are coupled and dynamically adjustable based on a geographical location of the one or more data collection devices and/or a residence address of the group of participants.

Another aspect of the invention concerns a prediction contest for sampling items using a computing system comprising: providing a set of one or items to be rated during an item sampling event in which the items are sampled by a group of participants; automatically generating a set of predicted ratings for said set of items by said group of participants using said computing system prior to said sampling event; automatically collecting at least a set of participant ratings for said set of items from said group of sampling participants during said item sampling event using said computing system; calculating a correlation between said set of participant ratings and said set of predicted ratings for said item sampling event using said computing system; providing a report to said group of participants which contains feedback relating to said correlation. Steps (a) through (e) can be repeated for a different group of participants, so that a report can be published identifying a ranking based on a respective correlation for different groups of participants.

A further aspect of the system concerns one or more systems which include a number of software routines for causing one or more computing devices to effectuate the above different aspects of the invention.

DESCRIPTION OF THE DRAWINGS

FIGS. 4A to 4E illustrate aspects of an exemplary embodiment of a website of the present invention configured to support gourmet item sampling events.

DETAILED DESCRIPTION

Figure 1:
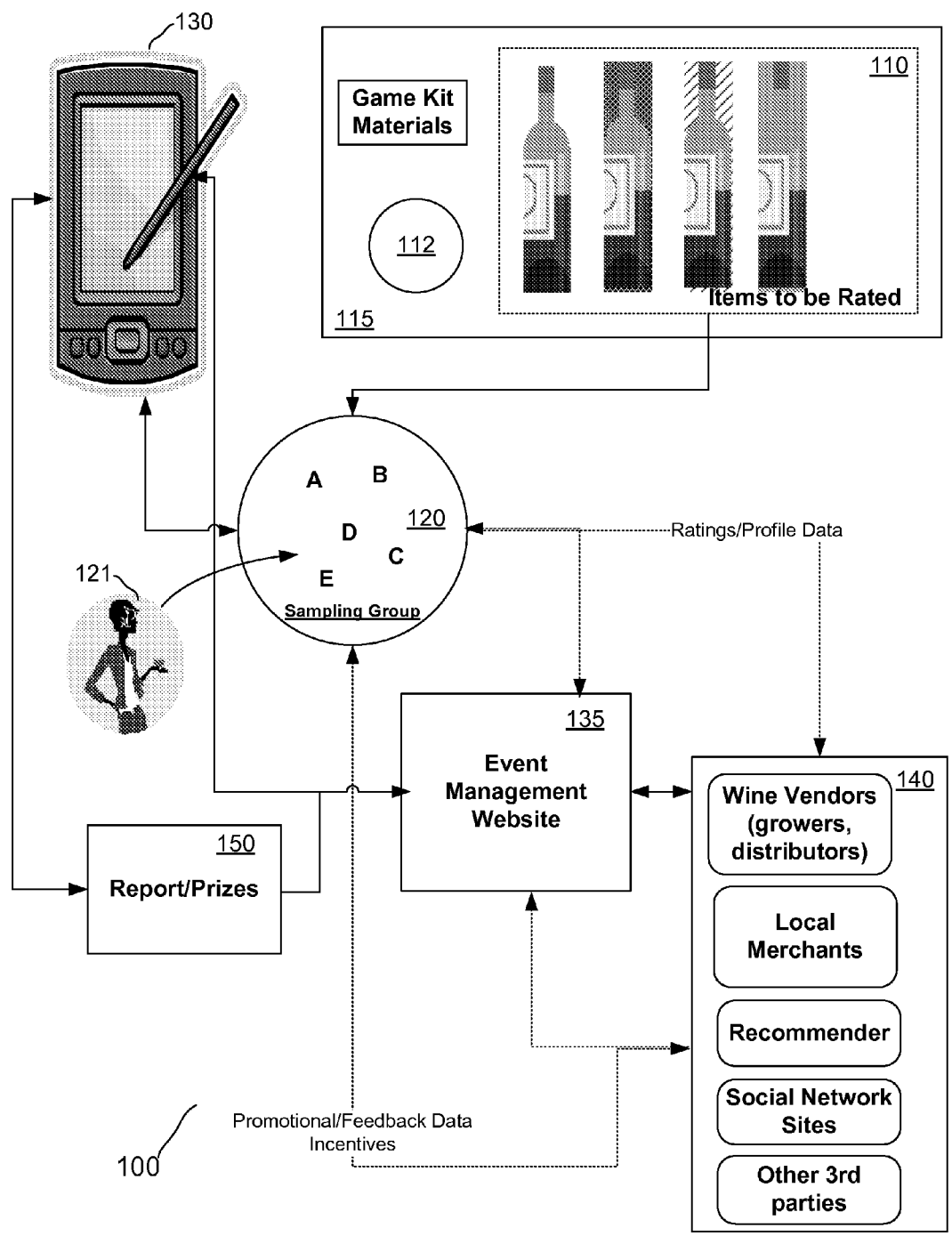
FIG. 1 is an illustration of the main components of a preferred integrated gourmet item data collection/recommender/vending system of the present invention.

FIG. 1 is an illustration of the main components of a preferred embodiment of an integrated gourmet item data collection/recommender/vending system 100 of the present invention. A group of items 110 preferably include, for example, a set of distinct wines to be rated by a sampling group 120. While the items described herein are preferably gourmet consumable items, such as wine, cheese, etc, it will be understood that the invention has beneficial applicability to other domains and products where it is desirable to collect data from the public. Other types of items also lend themselves to group/social gatherings, discourse and ratings, such as book readings, movie previews/reviews, music pieces, sport teams, automobiles, political campaigns/candidates, and the like. Moreover while certain preferred vendors, e-commerce entities, etc. are identified, it will be apparent that other entities may be involved in the data collection, analysis and utilization processes herein.

In some embodiments, as explained below, the item set 110 may be in the form of a pre-packaged high end event "kit" 115 which includes all necessary items for conducting a consumer entertainment event for tasting and rating gourmet items, such as a collection of wines of a particular variety (i.e., Zinfandel, Cabernet, Merlot, etc.). Media 112 may be included with software and other data to allow an event host to manage and direct the event from a local computing platform, such as a personal computer. In some cases a basic data collecting tool 130 (discussed below) for executing the routines on media 112 can also be included since the cost of electronic components is constantly decreasing. The output of the data collecting tool could be collected by downloading it to another computing platform.

The items 110 may be in their original packaging/labels, or they may be re-packaged into generic containers (not shown) with no identifying information to permit blind sampling. In the case of original packaged materials the kit can also include preprinted wrappings/adhesive labels (not shown) for masking an existing label on an item and so as to facilitate a blind tasting if desired. In the case of generic containers they can be adapted to include convenient markings thereon to identify suitable pouring amounts for a sampling. For example a 750 ml bottle may have 15 markings corresponding to 50 ml each.

This "complete event in a box" approach may also be attractive for parties, corporate retreats, etc. at locations where it is desirable to have all components of an entertainment event self-contained in a single package. It will be understood of course that the composition of the item kit will be a function of the specific items to be reviewed and is expected to vary between applications. For example in the case of a political discourse gathering the items may be audio-visual blurbs or ads for a candidate. In the case of movie/music embodiment the items may be snippets of content, and so on.

Sampling group 120 includes a number of participants 121 who are designated A, B, C, D, E, etc. in FIG. 1. While in a conventional consumer event the participants are human, it is not unreasonable to assume that at some point in the future automated robotic entities may be involved in evaluating and rating the taste and desirableness of consumable items. The site where the sampling group 120 is congregated may be at a consumer residence, a restaurant/bar, a wine cellar, or any other convenient assembly location. The sampling group 120 may be geographically distributed in some cases as well so that a "virtual" wine tasting could take place electronically.

In a commercial establishment embodiment, the set of items could be implemented as selections of a standalone unit within a well-known electronic dispensing system used for providing small samples of wine. By adapting such system to provide blind tastings, the invention could be implemented in conjunction with standard electronic debit cards typically employed with such applications. In such instances the card may in fact be programmed to record the customer's selections (such as which station the customer took a sample) so the customer does not have to remember such details. At a later visit the patron's card could be scanned to identify which wines they liked during the prior visit, thus increasing the odds they will find a satisfactory selection.

In a preferred wine tasting party embodiment the participants 121 employ a data collecting tool 130 for collecting event data which, in a preferred embodiment is a portable device such as a PDA (for example a Blackberry), a cell phone (for example an iPhone) or the like. A small computing system such as a notebook or PC could also be used if necessary. The data collecting tool 130 includes conventional networking capability (wired or wireless) to exchange/communicate event data, including with an event management website 135 discussed further below.

In one application the participants each include their own data collecting tool 130 which allows for more flexibility, privacy, etc. during the event data collection process. Furthermore other offers, incentives, etc. from vendors can be communicated more easily and directly in such fashion. However even a single data collecting tool 130 can be used as explained in further detail below. Data collecting tool 130 may also employ speech recognition and natural language techniques for collecting the item ratings data. These facilities may be built in directly within the device, or may operate in a distributed fashion with the assistance of server computers in a networked configuration.

A variety of mechanisms can be used for collecting the identifying information for each of the items 110 and profiles for the participants 121. Typically speaking an item to be rated will include an RF ID, a bar code, a label or other identifier that can be examined and correlated uniquely to a particular item. This data can be input manually to data collecting tool 130, or in some cases, can be captured electronically directly from the item itself. For example an RF reader, a bar code reader or image capturing device (i.e., an onboard camera not shown) can read/scan an identifying label for an item. The image/bar code data can then be decoded and correlated with conventional software to a determine a match from a database of items (not shown) to identify the item in question. In some cases, as in a high end gourmet kit embodiment noted above, a package of items 110 may include electronic ID information stored on a conventional memory media device such as a USB card, a memory stick, and other similar devices. Other examples will be apparent to those skilled in the art. Profiles for the samplers 121 can be determined automatically either from prior records for such entities, information gleaned from their respective data tools 130, from a social networking site profile, etc. In some instances the profiles can be received as part of a data sharing arrangement for members, such as offered by the Google or Facebook Connect programs for example. In other cases profile data is simply entered manually as desired to data tool 130.

Other event related data (such as situs, date, time, control conditions) can also be collected as desired.

The event data, including profile data and item data is (optionally) communicated to an event management website 135, and in some cases directly to a variety of interested commercial entities 140. In the latter case this can include, for example, one or more brick and mortar entities, such as wine vendors (growers, distributors, etc.), local wine merchants of wine, etc. and e-commerce operators such as wine recommender sites, social network sites and other online operators.

Such entities 140 can similarly generate their own respective feedback, promotional and other related data for the event, which is pushed back to one or more data collecting tools 130. For example upon detecting that a participant 121 has rated a particular wine with a favorable rating a wine vendor could push an electronic coupon to such participant either electronically by data collecting tool 130, by email/electronic message, and/or by conventional mail. In instances where the vendor receives advance notice of the event, they can opt to send samples or promotional items ahead of time to gain access to the participant opinions and samplings. Other examples are discussed below.

For some applications data collecting tool 130 is also responsible for managing, reporting and analyzing the results of the event data as noted at 150 to determine potential prizes and the like for individual participants. This analysis is preferably done dynamically as the item rating data is collected, but could be done at the end of the process if necessary. The nature of the competitions, games and prizes is discussed further below.

In other cases the managing/reporting/prize analysis of the event may be done remotely by event management website (or another site) 135 which has a separate computing system (not shown) which has more resources, is more adapted for such task, etc. The report/prize data can then be communicated back to the participants as desired during or at the end of the event.

The general features and interfaces of event management website 135 are discussed below in more detail in connection with FIGS. 4A to 4E. Generally speaking this website can be programmed with suitable intelligence to effectively manage a number of ongoing events for hosts and participants. The events of course can differ, but for purposes of illustration a wine sampling application is presented herein as a preferred embodiment.

The event management website basically coordinates with online users to help them set up and operate sampling events for wine. The website can also be configured to operate all aspects of the event if necessary. So, for example, during the event itself, the ratings data can be sent and processed directly at website 135, and it can coordinate between respective entities 140 to determine appropriate feedback for the participants. This has the advantage of centralizing the event data and management for multiple vendors.

Figure 2:
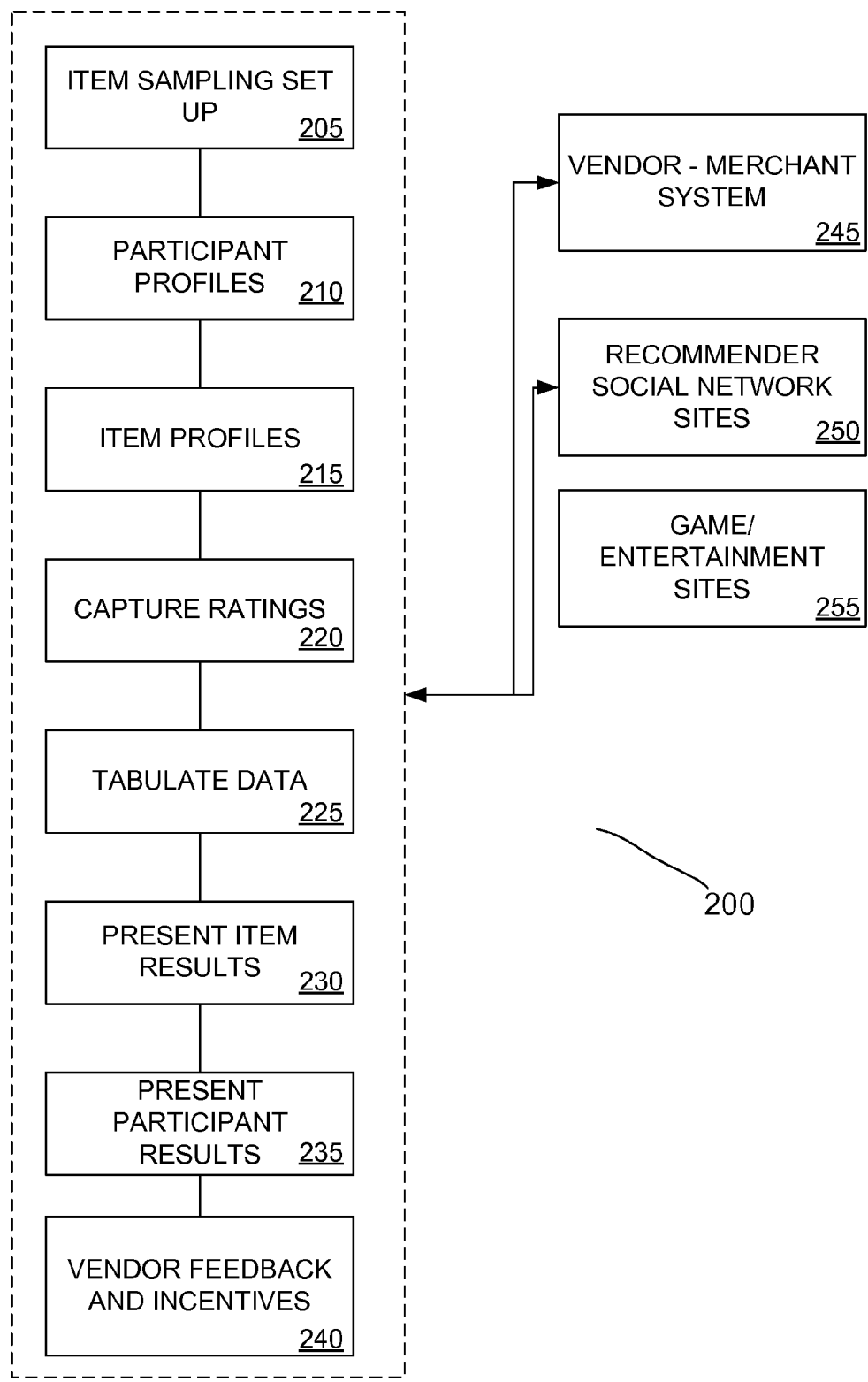
FIG. 2 is a flow diagram depicting the steps used in a preferred embodiment of the invention for collecting and analyzing ratings for items.

FIG. 2 is a flow diagram depicting a data collecting operation 200 of a preferred embodiment of the invention for collecting and analyzing ratings for items. At step 205, the items to be rated are sampled are set up in appropriate fashion for sampling. As noted above this could take place at consumer's residence or in a commercial establishment such as a restaurant, wine tasting room, bar, etc.

The setup step 205 should also assist an event planner or manager in determining the format to be used for the sampling, including, for example, the type of data to be collected, rules for participants, and rules for scoring/prizes. As an example the set up step 205 may specify a number of event parameters such as:

a ratings scale to be used in a scoring process;
whether items must be given different/unique ratings;
whether ratings scores are to be normalized for each user;
whether (and which) certain types of ratings scores should be weighted or eliminated from consideration in a final scoring process;
what types of ratings are to be provided by participants (see below);
whether event data, including ratings, participant profiles, etc., are to be shared with other entities, and, if so, which ones;
whether prizes/awards are to be employed in the event, and, if so, what types (explained further below);
whether one or multiple data collecting tools 130 are to be used;
whether the event is to be registered, and, if so, at which establishments;
what kind of food, if any, was served as an accompaniment (in the case of a wine tasting).

These are but examples of course and other potential event rules will be apparent to those skilled in the art based on the particular application. All of these parameters may be entered into a suitable event set up interface of event management website 135 as explained below. An example of a preferred data screen for use with an event management website 135 for this purpose is shown below in connection with FIG. 4A.

Returning to FIG. 2, at step 210 the individual participant profiles are obtained. Again, as noted earlier, this may be secured from preexisting database records, from information gleaned from a participant's data collecting tool, etc. Alternatively it can be entered manually to compile an event participant list using an interface of event management website 135 as seen, for example in FIG. 4B. As seen therein a user can simply connect to an event in progress at the appropriate time.

Again in FIG. 2, the participant data preferably includes such information as age, sex, residence address, and other similar demographic data. Other data can be collected as needed for particular applications, such as income, occupation, place of employment, passwords, social security numbers, driver license nos. credit card nos. etc. subject to privacy considerations and participant comfort level. In some applications it may be desirable to collect other account data for participants, such as food/wine club memberships at local markets, email accounts, social networking site IDs/accounts, etc. This additional account data can be used more easily by merchants to identify and correlate incentives and other feedback correctly to the right individual. As an example the event data can be more easily captured (along with images, photos, audio data) and published as content on a participant's social networking page in an environment such as that offered by Myspace, Facebook, and other similar sites.

At step 215, the items to be rated are analyzed as noted above to collect their identifying criteria. For example in a wine tasting event, the items would be individual bottles of wine from a particular vendor, including a variety of grape, year of bottling and retail cost if desired. Generally speaking, website 135 is enabled with a feature (see below in FIG. 4A) that allows a host to merely specify these parameters so that the wines are automatically selected, packaged and delivered to the event host prior to the event date. In other cases website 135 may merely provide a list of suggested items to be included in a sampling, which list can be shared and communicated to other participants to ensure proper representation.

Accordingly in certain embodiments where the participants bring the items directly, they may be told to restrict the items to wines of a particular grape type and a particular price range to limit variability and improve the usefulness of the collected data. To increase the entertainment value the website event manager, or an event planner or organizer may "seed" the item set 110 with either or both: a) highly rated wines outside of the price range and which are considered significantly superior; b) poorly rated inexpensive wines that are considered inferior. These additional item points can further interject interest in the game as the guests can be told of such items and be asked to guess and discriminate their presence among another set of items during a blind taste test.

The data is captured manually or automatically as desired. In some instances it may be possible to have event management website 135 coordinate with local merchants using "registered" data events, in the same manner that weddings and the like are conventionally registered. In such cases the purchase of the item in question could be correlated automatically by software at the event management website 135 with the correct event to avoid further data entry impositions on the participants. By registering events it is also possible to avoid situations where guests bring inadvertently duplicate items. Furthermore the use of registered events allows an event organizer to monitor the state of progress of item collections (see below) and determine the composition of the item group, and thus determine whether supplemental purchases/items are needed to augment the samples.

During step 220 the participant ratings, predictions and other desired event data are collected, preferably at the time of the event and in real-time while the participants are involved in the event. In a preferred embodiment at least the individual item ratings are collected. The data can be collected by the event management website 135 (as seen below in FIGS. 4A, 4C), or by another program executing on data collection device 130. In the case of wine items at least, the identity of the items is preferably concealed so that the raters are not aware or biased by the source of the item. In the "kit" arrangement noted earlier it is possible that the individual items can be labeled with generic identifying information that conceals the true identity/source to preserve the integrity of the blind tasting.

In addition to rating data the event can be enhanced by the addition of other ancillary data that is used to further increase the interest and enjoyment of the participants. For example the event may be staged as a form of wine tasting game or competition in which participants are solicited not only for their own opinions of the item in question, but also for their predictions on: a) how their significant other would rate the item in question; b) how the other members in the sampling group would rate the item in question; c) how an expert or connoisseur would rate the item.; d) a cost for the item; e) whether they would recommend the wine to a good friend, etc. Other prediction/opinion data can be captured, of course, and the invention is not limited in this respect.

In some applications, particularly involving wine, the ratings data routine can be programmed to provide suggestions to the participants to capture other data specific to such product, such as the particular tastes or smells evoked by the wine, what food they may have had an accompaniment, and the names of any other beverages they may have consumed immediately before. This feature makes it easier on the participants to provide specific feedback data and allows them to learn about other qualifications/criteria used to judge the quality of wines. Similar options could be made available for other products.

The data is input either by touchpad, keyboard entry or speech by each participant into their respective data collecting tool 130 which is configured to manage the event in case event management website 135 is not used. In the case of a touchpad or keyboard entry, it is possible that other icons and interaction mechanisms could be provided to signify feedback. For instance, an iPhone like device could have an icon of a wine glass that the user interacts with to express a rating. This could be done by filling it to a certain level (1-10) or emptying to express a rating. In another case the size of the glass could be altered from smaller to larger with a finger touch to express a rating. Alternatively a visual graph or spectrum could be employed to express a more subjective rating.

In the case of speech input a speech recognition routine is used to decode words and phrases from the participant, typically in conjunction with a natural language engine. Furthermore in some cases it may be desirable (with the permission of the participants) to record and journal the discussions of the participants for each item for later review and study by vendors. These types systems are well-known in the art and thus are not discussed herein.

Again the act of collecting data can be managed through website 135 or locally as well. For example in cases where the participants have individual collecting tools 130, a main event organizer can coordinate the collection of data from each individual device by syncing up and collecting data from such separate devices—preferably through a wireless connection. Alternatively such devices can connect to website 135. Thus each participant tool 130 connects into an event organizer system operated on a main data collection tool 130 locally or remotely at website 135. This allows a large group of individuals to be managed from a single device platform for the convenience of the group, as the bulk of the compilations, tabulations, etc. can be done with a single tool. It should be noted nonetheless that the results of the event, including a report on item ratings, and other related event data, can be pushed to each individual device as desired.

If only a single data collecting tool 130 is employed, it may be desirable to shield the data input from respective participants. To accomplish this, an electronic shield or screen may be imposed in between individual participant entries. Thus each participant would only see their respective data input screens, and at the end of their turn, they would pass on the device to the next participant. The main data event routine would then automatically blank the data from the participant within the collection screen and present the next participant with the appropriate fields ready for data entry. An example of a data screen for use with an event management website 135 is shown below in connection with FIG. 4C.

At step 225 the ratings and prediction data are tabulated in accordance with the objectives and parameters set for the event. Thus the item ratings are evaluated and computed to determine a final overall rating/ranking for each item. An example of options available for ratings selectable by a host from an event management website 135 is shown below in connection with FIG. 4A.

As noted above the ratings from participants may be adjusted or normalized in some instances to provide better comparisons of data. Rankings and ratings may be presented with or without such normalizations.

More interesting, perhaps, are not the item rankings per se, but the participant ratings. For example, a determination can be made of the following:

1. A ranking of couple ratings comparisons, such as by identifying which couple provided the closest ratings results (as measured, for example, by a conventional least squares calculation);
2. conversely, within such set, which couple provided the most disparate ratings results (again as measured, for example, by a conventional least squares calculation);
3. which pair of people in the group provided the closest ratings data;
4. which pair of people in the group provided the most disparate ratings data; all of the above can be presented in some form of table or visual graph identifying associations between individuals for ease and convenience;
5. correlations between each participant and their deviation from aggregate group scores; for example, for the highest rated item, identifying the person who rated such item as the highest within their scores;
6. conversely, identifying the person who subjectively gave the lowest rating to the item rated highest by the group;
7. similarly, identifying the person who gave the highest rating to the item rated lowest by the group;
8. along such lines, identifying the person(s) who gave the lowest rating to the item rated lowest by the group;
9. identifying the highest rated items rated by sex or age groups.

These correlations, and others, can be compiled to provide insights to and for the benefit of the participants.

In some applications where it is desirable to add a gaming or competitive element to the event, it is possible to correlate the scores of participants against other third party references, such as wine experts, connoisseurs, and the like. This is also one of the options shown in FIG. 4A.

Back in FIG. 2 during step 220, the participants would be permitted to enter their predicted scores for what such third party references had provided to such item. Awards, prizes, coupons or other incentives can be provided by wine vendors and merchants to promote interest in such contests. The contests can be structured as a "predict the score of the experts" game to solicit predictions from participants and as a basis for further recognition within the contest. As noted above, the invention allows participants to provide further predictions on how other members in the group may rate a particular item. For example, spouses and other pairs of participants could be asked how their significant other would rate the item in question. This part of the tabulation provides interest to the participants as it helps to identify those couples with the most and least similar tastes.

Similarly, predictions made by participants about group tastes, expected costs, and recommendations are also useful for both entertainment purposes within the group as well as data collection for entities 140 mentioned earlier. By presenting the data collection in an interesting and entertaining manner, participants both enjoy the experience and provide valuable data to the various item merchants and other e-commerce operators. As noted earlier, the event data may be collected and uploaded dynamically to various entities directly or through event management website 135, such as to vendor-merchants 245, social network and recommender sites 250 and game/entertainment sites 255. This would have the benefit of allowing such entities to deliver feedback and/or content related advertising to individual participant's on-the-fly while the experience and impressions are fresh on the minds of such individuals, and directly in response to the ratings and prediction data provided by the participants.

In some instances entities 140 can be given access directly to tabulation data from step 225 as well, as maintained by a master event organizer routine executing on one or more of the data collecting devices, or at website 135. This allows for other dynamic recommendation "matchings" that can be provided in real-time to the participants. For example, a vendor 140 may note that individuals A and B are highly correlated in their wine (or other item) preferences. It may also be known (from other data mining resources) that certain wine preferences are also highly correlated to other preferences in art, literature, food, movies, or some other endeavor. A vendor computing system (not shown) can thus draw upon such recommendation technologies and give a suggestion to either or both individuals A, B based on their respective prior preference expressions.

So if participant A had recently purchased title X from Amazon, or rented movie Y from Netflix, these informational tidbits could be communicated to participant B—who is known to be highly correlated with A's tastes—in the form of friendly conversational ice breakers for such individuals to facilitate social discourse. Similarly the system could identify the fact that both A and B had recently seen or reviewed the same movie very highly, and this fact could be shared as well with both participants to increase enjoyment for the group.

Therefore, one corollary aspect of the invention allows for situations in which advertising and/or other solicitations for opinions on unrelated items are secured during ratings capture step 220 from participants. Thus a movie or book vendor 140 may be permitted to piggy-back on the event and make specific targeted queries interspersed during the event ratings periods to garner further opinion data, and/or provide targeted ads based on correlating such ratings to a database of other items and/or an advertising stock. Other advertisers could employ the same function for their products/services.

At step 230 results are presented to the participants regarding the overall scoring, rating of each item. An example of a preferred data screen for presenting such results with an event management website 135 is shown below and discussed in connection with FIG. 4D.

These results can be presented in a sequence based on a score, or, preferably, in a same sequence as that used for the sampling. This provides an opportunity to explore and investigate the character of each item among the participants without knowledge of the final results. Generally speaking if the sequence is done based on overall winners, losers, etc. the discussion portion is more focused on the results rather than on specifics of each entry. The data output can take any desired textual or graphical form.

In some instances it may be desirable to allow item vendors to present promotional materials during the event, so that as each item is presented and rated, various forms of background information are presented for the benefit of the participants. This can be displayed along with the results as seen, for example in FIG. 4D discussed further below.

Then at step 235 in FIG. 2 results are presented regarding the characteristics of the participants as explained above for step 220. An example of a preferred output for this step is also shown in FIG. 4D. This aspect of the event can also be highly entertaining as inevitably surprises and insights are gleaned by the participants from the ratings behavior of their fellow participants. Rewards/booby prizes can be then be meted out as this time as well, for example to the participants who meet the criteria noted above, and/or who brought the highest rated wine, or the worse rated wine, etc. etc. Individuals who were best predictors of their significant others, experts, and the group can also be recognized.

During step 240 the various vendors 140 are preferably allowed to present feedback and incentives to the participants. As noted earlier, the event data may be collected dynamically or collectively at the end of the event, depending on the particular application. The vendors 140 may or may not have access to the tabulation results, or any other prediction data provided by the participants beyond bare ratings for the items. Again, the extent and scope of the data to be shared is preferably left to the discretion of the event manager and the individual participants.

The feedback and incentives can take any number of forms. It may be as simple as generic gift certificates for particular types of wine (or for whatever item was being sampled) or other accompanying products (cheese, chocolate or other gourmet foods).

Coupons can also be distributed to the participants, either electronically or in hard copy form by regular mail. The coupons can be correlated to a participant's residence or place of work, so that they are usable only within certain establishments. These establishments, in turn can thus coordinate with wine growers, vendors, etc. to target particular individuals within a certain radius of their stores.

The main wine vendors could further track the participants' preferences, and then use a conventional map mash-up to further educate and point out the location of items of interest based on the results of the event. For example, a vendor could track a user's location and inform him/her that a merchant (or vineyard, or restaurant, or bar) at a particular location in their vicinity carried one or more wine types determined to be of interest to the participant based on the sampling event (and similar prior events). By providing this information immediately in conjunction with the occurrence of the event the vendors can capitalize on the participants' interest and afford them an easy opportunity to satisfy their wishes.

Other item related information could also be passed down to the participants, such as the history, production or marketing details of the vineyard in question for wines which they found attractive. Predictions and recommendations for other wines could be made as well, using standard corroborative filtering techniques.

Accordingly, a series of wine related coupons could be generated and customized for each participant, and downloaded automatically into their data collection tool 130, another electronic account, or under control of accounts through event management website 135. Again these are preferably used in establishments which have a relationship with the wine vendor. The coupons may be accessed directly from the participant's data collection tool 130 or another computing device, and thus easily redeemed (i.e. by referencing an identification number) from local merchants.

Figure 4B:
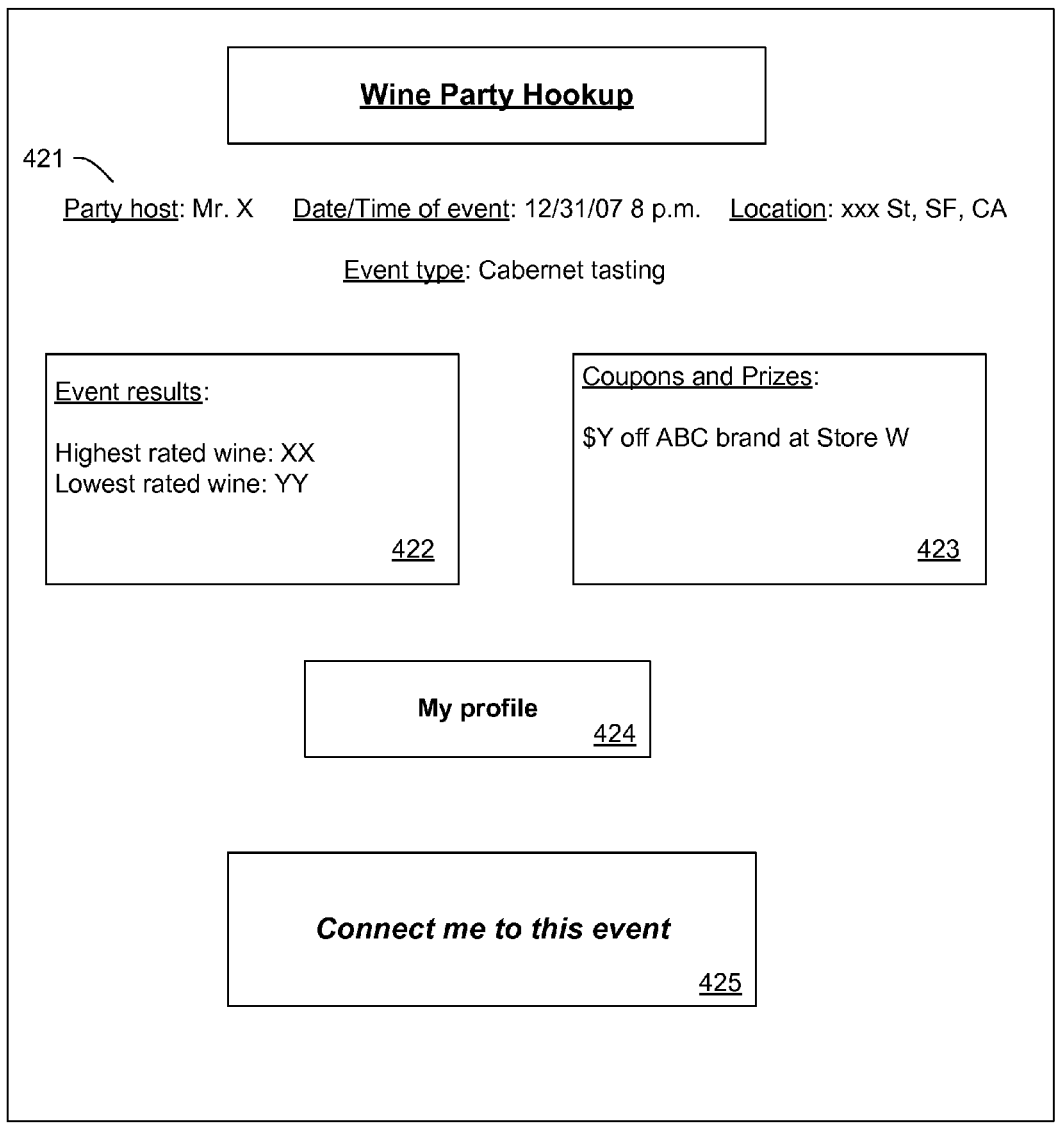

From a social networking perspective, the participants could be presented with additional information relating their ratings to other members within or outside of their social circles. For example a notification could be made to other members of their social group that the user was involved in a particular event. By educating them about other similarly minded persons the participants can again derive additional benefit and enjoyment from the sampling events. The option to elect such inclusion can be made, for example, preferably using an interface screen such as shown in FIG. 4B or some other suitable means.

As noted below, vendors can mine the lists to see who are good candidates for invitations to wine tastings and other similar parties. Furthermore the vendors may be able to do more sophisticated data mining to detect more subtle correlations, such as whether there are any material ratings differences depending on a sequence in which two items are sampled, or if certain items tend to be rated higher when they incorporated into samplings with other particular items. For example, an item A may tend to receive a higher rating when it is sampled right after item B, instead of being sampled before item B. These types of correlations can be identified used, in fact, to develop preferred "sequences" of wine tastings for those persons interested in optimizing an enjoyment of a sampling event.

Figure 3:
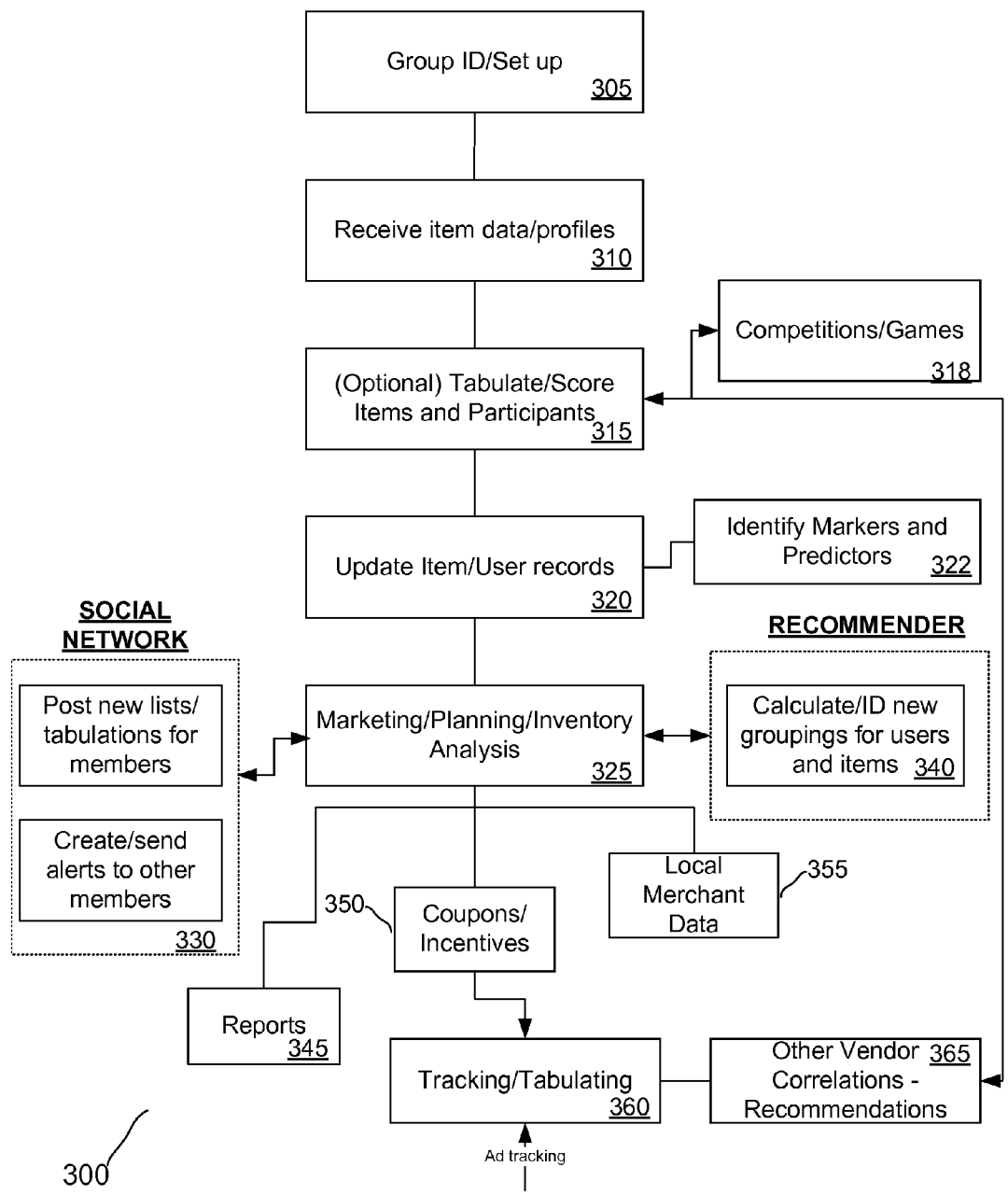
FIG. 3 illustrates the main components and operations used in a preferred back end process of the invention for compiling and updating ratings, users, etc. at respective e-commerce sites and other vendor facilities.

FIG. 3 illustrates the main components and operations used in a preferred back end process of the invention for compiling and updating ratings, users, etc. at respective e-commerce sites and other vendor facilities. This back end process is preferably implemented as one or more software routines executing on a variety of servers at event management website 135, or at other computing systems controlled by the various respective entities.

At step 305 event management website 135, or a vendor computing system (not shown) provides basic set up information for the event, such as by assigning an event ID, a group ID, or similar identifier. This identifier could include a list of the items, the participants, the location of the event, and other similar reference data.

In the case of a prepared or packaged kit, event management website 135 or the vendor (or some other entity) is responsible for compiling an appropriate set of items, which may be associated with a kit identifier. Website 135 can include programmed logic for this task; alternatively the vendors and other similarly situated entities can design the kits based on their particular marketing and research needs.

For example, a wine vendor may want to see what the public's reaction to various formulations or mixes of the same type of grape, say Cabernet, Merlot, Pinot Noir, Chardonnay, etc. The kit items would thus be constituted of multiple variants from the same grower/vendor. The kits could be supplied directly to event hosts, therefore, or to website 135 for distribution through managed events.

The ratings data received from the event could then be used by vendors to determine optimal blends for production and planning. In other instances a vendor may want to know how their product stacks up competitively against other selected products from unrelated third parties. The kits would then allow such vendors to reach out and determine the competitiveness of their product in a real-world environment. The composition of the item set in the kit, therefore, can be tailored as desired to provide meaningful experimental feedback data. The kits may include other complementary products, of course, which may designed to optimize the enjoyment of the product in question, for example, cheese, crackers, bread, nuts, fruit, etc. in the case of wine. The value of website 135 as an intermediary is thus potentially quite useful as the manager of such system can pick and choose from different vendors, and create customized kits as needed by individual events.

During step 310 the item data and user profile data is uploaded. The items are correlated as necessary with a database of items (not shown) for purposes of accurate record keeping. When the item is unknown, or new, the back end process 300 can create a new record as needed to begin the compilation process. Again in a kit implementation the data is already pre-stored.

Similarly the profile data for the users is recorded and maintained for the event as well. As alluded to above appropriate privacy measures can be implemented to assure the anonymity of the users.

In embodiments where website 135 or the vendor is conducting scoring, tabulating, etc., this is done by any conventional means as shown in step 315 in accordance with the guidelines noted above. Alternatively in implementations where the data collection devices 130 contain such functionality, the already tabulated data is uploaded to the back end process. It will be apparent that the tabulation of the event data could be done partially at both locations to share the burden and so as to integrate other data from sources unavailable from one or other systems. For example a website 135 or vendor back end routine may have access to data from other sources through contractual relationships that are not available to a typical end user of a data collection device 130. The back end process may also have access to more powerful data computation and presentation tools which can be used to enhance the feedback provided to the event participants.

If a competition or game is implicated as part of the event, the website 135 (or vendor) accounts for and determines whether any of the participants are entitled to prizes and the like at step 318. Again the format and prizes will vary according to the particular application. As noted earlier one type of award may hinge on the ability of participants to guess the ratings previously provided by known experts.

At step 320 the item and user records are updated based on the scores and other attributes provided to the items, and the ratings, predictions and other data provided by the participants. Again the amount and types of data to be collected and stored will be a function of the articles in question and the particular system to be implemented.

One or more calculations can be performed at step 322 to identify markers and predictors. These correspond to individuals among the participants who have distinguished themselves as reporting scores for items which tend to track the mean, median or other statistical parameter of the event group, a reference set of tasters, a larger population group, etc. In other words these persons are singled out for their predictive prowess as it were because their tastes are found to accurately mirror/predict the ratings of others. These individuals may be targeted/solicited for inclusion in focus groups and other events sponsored by vendors to help rate and identify new products. Other offers and incentives may be presented to such individuals to glean their insights.

Other tabulations gleaned from operations associated with step 225 (FIG. 2) can also be compiled. For example, a website 135 (or vendor or other entity) may want to compile records on couples who tend to have similar tastes, or high accuracy ratings in terms of predicting each other's tastes.

The information obtained from the item ratings and scores can also be used at step 325 for marketing, planning and inventory analysis routines. For example, if a particular item is found to be particularly appealing to a particular demographic profile, this information can be provided and used in a targeted marketing campaign so that the selection of individuals receiving such promotions are likely to respond favorably. Other uses for this data will be apparent to those skilled in the art.

Similarly if a particular item is found to be very popular this fact can be used to identify potential inventory shortfalls, production changes, etc.

Conversely an item that is not found to be desirable can be deemphasized as needed in favor of better performers. This type of analysis, of course, is most useful early on in the introduction cycle of a new product since sales and adoption rate data may be incomplete. Again the collection of this data by website 135 places it in a unique position to provide valuable insights to item vendors and distributors.

Website 135 and/or vendor(s) may then use the event data, including tabulation data, to generate reports 345, coupons/incentives 350, and feedback to local merchants 355. The reports may take any number of forms suitable for relating the general parameters of the event and the results thereof. Again, as noted above, in the context of an entertainment event the report may include text, charts, figures and other graphical data that communicates the scores of the items, scores of the participants, item-item correlations, and participant correlations among other parameters.

In some instances the reports may take the form of ongoing alerts to the participants, informing them immediately when special offers are available on items which they rated favorably at the event, or for items determined to be likely of interest. These alerts may be geographically targeted as well, and be correlated to the participant's physical location, so that, for example, an alert for item A only appears when the user is in one location, while an alert for item B would appear when the user is in a separate location. The participants can elect to subscribe to such alerts on an item by item basis or any other appropriate level of control.

The reports may also inform participants of other complementary products they are likely to enjoy as a result of their scoring on the event items. Coupons/incentives 350 may also take a variety of forms depending on the implementation. As noted above the coupons may be in paper or electronic form, and may be delivered by regular mail or electronically to the participants and other targeted members of the public. A coupon preferably is in electronic form suitable for delivery to the participant's computing device (including data collection device 130 in some instances) and will be correlated (or redeemable conditionally) in some fashion with a merchant with whom the vendor has a favorable relationship, and/or a merchant this is geographically located proximate to the event site, the domiciles of the respective participants, or the residences of other targeted members of the public. The location of the participant can be determined by reference to GPS data, cell tower data, packet delay data, etc., and other mechanisms known in the art. Additional geographic mapping data can be provided along with an electronic coupon so that when it is delivered to the participant's data collection device 130, an electronic map can be presented to the user indicating the location of the nearest store/merchant carrying the item(s) in question to facilitate and encourage purchases of the products from preferred merchants. The coupons can be for items of the same type as those rated in the event, or they can of course be simply other items.

Alternatively an email or other electronic message can include embedded electronic links and other content related to an online vendor of the items. So, for example, a participant may receive an email with links informing them of a number of online wine vendors who have the best price available for one or more wines rated highly by (or predicted to be desirable for) the participant. The links can be generated by an electronic based mass marketing system (not shown) that automatically executes targeted searches based on the wine in question (i.e., a 2004 Stag's Leap Chardonnay) at competitive shopping sites (i.e., such as Google's shopping site) and delivers results directly to the participant. This type of targeted marketing allows for higher conversions and monetization of such advertisements. By partnering with direct to consumer wine retail websites, a portion of such leads generated by the present invention can be captured in the form of commissions.

Therefore at step 360 the back end process (at website 135 or at a vendor site) preferably performs tracking and tabulating of the redemptions made by participants and other persons for the coupon products in question. This monitoring of the performance of the coupons/incentives allows for further refinement, targeting and follow up with the appropriate consumer profile. For example, the redemption rate for coupons of varying values, for particular local merchants, for particular products, etc., may be compiled to determine the efficacy of the promotions. Other events which can be tracked, of course, include the participant selections of advertising presented for such products, as referred to above in FIG. 2 reference numeral 240.

As shown at 365 website 135 and/or the vendor may also have their own database for tracking item and participant correlations. This may be done using any conventional collaborative, corroborative, or other data filtering techniques known in the art. This allows website 135 and/or the vendors, for example, to identify clusters of participants with similar tastes, items which tend to be correlated well with other items, etc.

So for example, after reviewing event data and noting that person A preferred product X, the system may note that person B, who is well correlated to A, has not tried X at this time. This analysis (other techniques are also possible of course) can help to provide predictions and recommendations to person B (and others similarly situated) by website 135 and/or the vendor for more effective targeting. Similarly the item ratings can be updated to determine item-to-item correlations. For example, the system may note that persons who rated X highly also rated Y (and other products) highly, and so forth. This information can be used, again, for marketing, advertising and other promotional purposes. Thus, when person A expresses an interest in product X, website 135 and/or the vendor can generate a prediction and related recommendation for A to inform him/her of the existence of Y (and others as appropriate).

Again, as noted, the recommendations can take the form of very specific geographic targeted alerts, messages, so that when A is in a particular store (brick and mortar or virtual) the system can detect his/her location, and notify A (through a PDA/cell phone browser, or Internet interface) that product Y is available (again, perhaps with an accompanying electronic coupon) within such within such establishment (including websites of course). Thus the invention correlates user location with items/products in which they have expressed an interest (or items which are predicted for them to be of interest). It then helps them to easily identify proximate sources of the same, and particularly from establishments who are coordinated with website 135 and/or the vendor to effectively market/sell targeted products. In some implementations a data collection device can be set to an auto-item discovery mode, so that when the participant is within an establishment, the device can inform the person on whether there are desirable items at such location. This creates an end-to-end virtual marketing/distribution chain that is optimized for the user dynamically on a location and product basis.

At 355 the local merchants are provided with excerpts, as desired, of the tabulated ratings and other event data. This assists such entities in performing their own localized target marketing to individuals located in close proximity to their establishments. This information can also assist them in determining their own planning and inventory management.

The event data can also be provided to generic product recommender systems at step 340. For example, other websites or other set of vendors may be interested in maintaining a database of user tastes, user clusterings, item correlations, etc. for their own respective collaborative/corroborative filtering system. As noted earlier, a number of third party sites are known to provide suggestions and ideas for wines, and thus such entities can exploit the data collections maintained by embodiments of the present invention. These entities can maintain their own separate user clusterings, item correlations, etc., or they can simply use the already tabulated data from the vendor as created at 365.

In some embodiments the activities of the participants can be communicated to and recorded at one or more social networking sites as shown at 330. For example a social networking site member may be a participant in one of the events noted herein. This fact, along with (all or some portion of) the person's preferences as expressed in the event, may be communicated and maintained either at such member's personal site, as part of a personal data feed to other selected members, or at other social groups maintained at such site. For instance the social networking site may maintain a wine group that tracks ratings and interests for its members. The tabulated data from the member (and other members from other events) can be used to compile one or more lists of brand items preferred by such site members.

Again the inclusion of such data at the social networking site would be an option available to the member at his/her own discretion. The participant may elect for the event data to be selectively disseminated to preferred members of course, including only persons within a certain select circles or designated degrees of friendship/kinship. In some cases it may be possible to anonymize the data from participating members so that only the raw ratings are provided at step 330 for compiling of the community's overall tastes.

It will be understood by those skilled in the art that the above is merely an example and that countless variations can be implemented in accordance with the present teachings. A number of other conventional steps that would be included in a commercial application have been omitted, as well, to better emphasize the present teachings.

The features, functionality and appearance of a preferred website 135 configured in accordance with teachings of the present invention is shown in FIGS. 4A to 4E. These figures illustrate examples of interfaces and functions performed in a preferred embodiment of the invention in which the items consist of wine articles.

In FIG. 4A, a preferred embodiment of a wine party event setup interface 410 is depicted. This screen is primarily responsible for collecting the setup information discussed above in connection with FIGS. 2 and 3, including steps 205-215. The entry fields and options are self-explanatory but are explained here further nonetheless. As seen in FIG. 4A, a party host can specify the date and time of an event, and the location. The party host can also specify what type of event is required (in this case a tasting of Cabernet related wines). The event ID and Kit ID are also shown for reference and administrative purposes. A participant response status is also conveniently displayed so that he host can determine an expected attendance and progress to date in collecting appropriate samples (when that option is elected).

The Event details 415 also highlight other options that can be elected. For example, a host can decide whether they are going to run/manage the event on their own, or if they are going to rely on wine party website 135 instead. In the former case the host can then also specify the nature and contents of media 112 to be used, so that it can be customized to their liking and requirements. Similarly the event host can specify that they are going to supply the items, or that the wine party site should supply the wine. In the latter case the host can elect for the items in the kit to be automatically compiled in accordance with the criteria noted above in step 215, i.e., to include wines in particular price ranges, for particular wineries, or even request a randomized option. Furthermore the host can specify whether the event is to be a blind tasting or not. In those cases where website is to supply the items, an option can then be elected for the bottles to be shipped to the event host with blanking labels to obscure their origin. Alternatively if the host is to purchase the wines they can nonetheless request a set of masking labels from website 135.

As noted above in step 220 the event host can specify what types of data are to be collected, including ratings, predictions, profiles, etc. as noted earlier. Another selectable option is whether or not the item suppliers are allowed to present short multimedia promotions during the event as discussed above. Furthermore the website 135 can be instructed to conduct various forms of games, competitions within the guidelines addressed earlier. For presenting results (as discussed for step 230, 235) the system can be configured to present such information only to event participants, or to share it with other vendors and merchants.

The types of prizes, promotions, etc., can also be specified as noted to include coupons and other incentives. To optimize response rates the system can be directed further to send timely reminders to participants through different delivery channels. Similarly the system can include a "preview" option in which the overall selection/list of items is sent in compiled form to the participants to educate them in advance of the selections to be sampled at the event. Finally the host can also ask for suggestions on particular types of foods to accompany the tasting, and direct that such also be included as part of an event order.

All of the above options are modifiable directly within interface 410, and/or in more detailed form using a button/field 412. The latter merely presents an additional menu/screen (not shown) for collecting this data in any desired and conventional manner known in the art.

Within the interface are also further options for configuring the event. For example at button/field 411 an additional menu/screen (not shown) is implemented in conventional fashion for capturing the participant names, emails, and other desired profile information as noted above in step 210. Field 413 allows the event host to select among and pick the different types of sampling kits that can be used for the event as noted above. The host's account information, including contact and billing information, can be selected from field 414. Again, these are but examples of the kinds of fields/data that can be collected within an event set up interface, and it is expected that commercial embodiments will vary visually and functionally significantly from this and from each other.

In FIG. 4B, a preferred embodiment of a wine party event hookup interface 420 is depicted. This screen is primarily responsible for permitting individual participants to connect to specific events. Thus, each participant preferably has an account which permits access to different events which the participant is invited to. A participant would be given an access code or other URL for accessing the event associated with entry screen shown in FIG. 4B. Fields 421 provide the identifying information for the event. At field 422 a participant can see the results (final or in progress) for the event, including winning wines, winning participants, and the like. In portion 423 of the interface a participant can view his/her prizes, individualized coupons, targeted promotional materials, etc. Other marketing information, ads and similar content can also be presented.

Profile information can be seen/altered at portion 424 of the interface, including demographic data, residence/work addresses, interests, affiliated account names at other sites (such as social networking sites), etc. This allows for sharing and publishing of the event data at the participant's discretion. An RSS feed can also be provided for interface 420 for the benefit of broadcasting a participant's results.

Lastly, portion 425 of the interface includes some activatable button or URL to cause the participant to be connected to the event in question. By connecting to the event the participant can then participate in the rating of items, review of contents, collection of promotional materials, etc.

Next in FIG. 4C a preferred embodiment of a ratings capture interface 430 is shown for the invention. Again the entry screen is adapted to capture ratings by individual in a region 431, including the parameters discussed above in connection with FIGS. 2, 3, such as item ratings, predictions for other individuals, predictions for expert ratings, and other descriptors. Suggestions for descriptors can be given to the raters to facilitate data entry. As noted earlier in the preferred embodiment the screen resets itself after each person makes an entry and sequences to the next individual to allow for anonymous ratings collecting.

In FIG. 4D a preferred embodiment of a results interface 440 is shown. In region 441 of the display it can be seen that scoring data is compiled and presented for the participant's benefit, including an overall ratings score, statistical information, relative placement of the item compared to others, predicted data, etc. It should be noted that all or some portions of the results interface may be presented to individual participant devices 130. In some cases it may be useful to depict the ratings data in graphical format.

At portion 442 of the interface the vendor of the item is given a canvas or display region in which to present multimedia information concerning the item, such as text, graphics, images, video, audio, etc., conveying background information on the items in question. Awards and other related data can also be presented for the viewing audience's pleasure.

This feature allows the vendors to showcase their wines and promote themselves in short, succinct snippets.

In area 443 of the interface the participant can see predictions and recommendations for other wines/items based on correlations to other items. Negative correlations can also be accommodated if desired. Thus the participants can be given specific tailored suggestions on items that they are likely to enjoy given a positive/negative rating for a particular wine.

Finally, in area 444 the interface is adapted to allow participants to opt in to receive additional promotional materials, discounts, coupons, etc. for the item in question. For individual devices 130 this may cause the promotional data to be downloaded directly to the same, or in other cases it may be sent in email form. While not shown in interface 440 it will be apparent that other areas of the display could be modified to provide more comprehensive results comparing the entire item set, the entire set of scores for participants, etc.

Figure 4E:
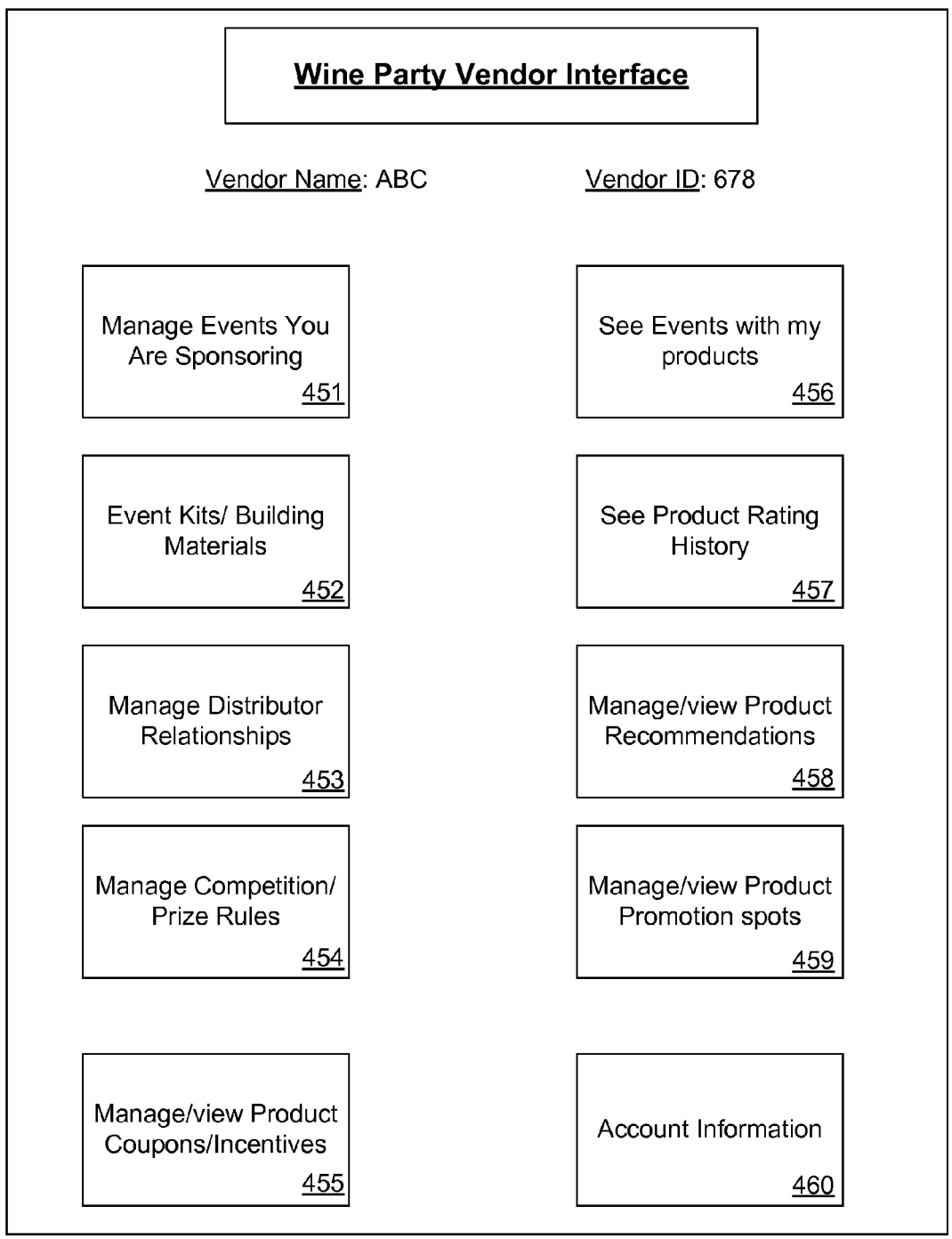

FIG. 4E shows a preferred embodiment of a vendor interface 450 as could be employed in embodiments of the present invention. This data capture/presentation screen permits vendors to manage and coordinate multiple events involving their products. Thus, for each vendor, a software tool is provided at 451 to manage specific events. While the specific format of this event manager is not shown, it could take the form of FIG. 4A, modified of course by any vendor's requirements.

At entry area 452, a software routine is adapted to allow the vendor to propose/construct event kits suitable for use at the item sampling events. For example, the vendor may provide a list of wines of a particular vineyard and grape type which they want website 135 to present as an event kit. Alternatively this feature can be used by the vendors to vend specific kits independently with stock items from the event management website 135. For example it may be desirable to re-package the vendor's items into suitable form (standardized bottles, containers, labels, etc.) that is consistent with a preferred appearance for the kits.

For the distributor relationship manager function shown at 453, a routine and related databases are adapted to permit the vendor to identify key relationships with distributors, and to set up prioritized designations of entities to be associated with participants. For example, as noted above a vendor may designate a particular set of distributors to be used in events associated with a particular zip code. The vendor can also specifically identify other websites (including social networking sites for example) which are permitted to share or access data for particular events, products and/or participants. Other examples will be apparent to those skilled in the art.

An additional software option for managing competitions, prizes, etc, is provided for at functional selection 454. This allows a vendor to set up various games in accordance with the discussion above in connection with step 318 and related procedures (FIG. 3). Similarly, an option 455 permits the vendor to manage product coupons and incentives, such as designating which items are to be associated with coupons, the amount of such coupons, the locales of such coupons, the demographic profiles of target participants, etc. Again this information would be stored in a conventional database using well-known software and query techniques.

At option 456 the vendor is permitted to see a complete list of all events associated with their products. Again, any form of presentation and format known in the art would be acceptable for this purpose. Preferably the vendor can see all upcoming events sorted by date, by item, by participants, by demographic groups, etc.

Option 457 invokes a routine that displays product/participant rating histories. This, again, can be supported using any number of conventional software programs and associated databases. This feature preferably allows a vendor to sort and tabulate products by identifier, by ratings value, etc., and to identify participants who rank their products high (or low) as well. The performance rating of an item can also be tracked over time to see if it is changing. Similar studies can be made of individuals, as well, to see if their interest is waxing or waning in the vendor's products. All of this data can be used to help develop and focus marketing/advertising campaigns and literature.

At option 458 the vendor can manage and view product recommendation data, again using conventional software and databases adapted for such purpose. The system preferably allows a vendor to exploit both collaborative filtering (person to person) and corroborative filtering (item to item) techniques to identify trends and correlations between persons and items. The vendor can also, if desired, explicitly bias the system so that a first item is correlated to a second item for promotional purposes. Other correlation adjustments can be made as necessary to promote the goals and targets of the vendor, such as by increasing or decreasing the probability of certain predictions, recommendations, etc. Correlations between unrelated types of items can also be specified, for example, so that a certain wine is recommended with a certain appetizer, dessert, etc. By developing/accessing user correlations the vendor can also begin to compile a library of individual tastes for their products and identify candidate persons for the types of functions noted above in connection with procedure 322 (FIG. 3).

Using option 459 a vendor can manage and view product promotional content, including snippets of multimedia data appropriate for presentation within a user interface at device 130 as noted earlier. The vendor can also upload and edit content using conventional routines to format the same into correct form for different types of participant computing platforms. The promotional content preferably should consist of short audiovisual presentations describing the history/background of the product, the vendor, etc., or in the case of wine, information on the locale where the grapes are grown, the harvesting and manufacturing processes, quality control parameters, awards and other related advertising data. Again in a sampling event context it is preferable that the promos be of the same length, and not be too long so as to bore participants. The amount of time will vary according to product of course, but in most cases a few minutes or less may be appropriate for the item in question.

The vendor is also given an option at 460 to manage their generic account information, which may include passwords, billing information, addresses and other administrative data.

Again while illustrative data entry fields and content are depicted in FIGS. 4A-4E it will be understood by those skilled in the art that other data can be captured and presented, and other mechanisms can be employed to solicit the required information. The final form of such interfaces are expected to vary widely in accordance with the application and the nature of the items.

Figure 5:
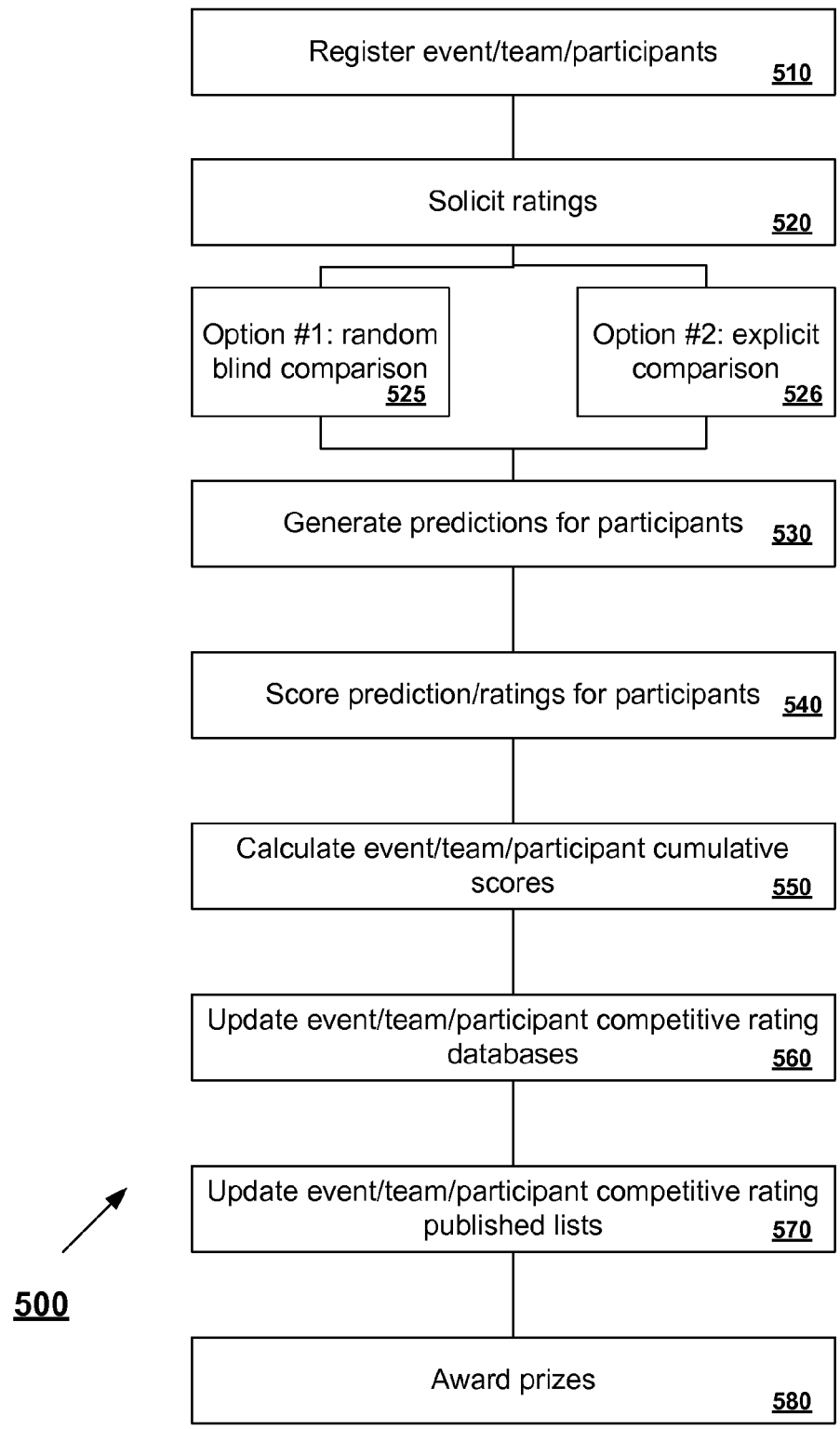
FIG. 5 illustrates a preferred process for conducting a competitive ratings game 500 as part of a gourmet item sampling event.

FIG. 5 illustrates a preferred process for conducting a competitive ratings game 500 as part of a gourmet item sampling event. This aspect of the invention allows participants to be evaluated and rewarded on an event/team basis for consistency and accuracy of their ratings data. From a high level perspective this feature allows participants to match their ratings against a prediction generated by a computerized scorer monitoring the event. Participants can then be rewarded based on how closely their ratings match the predictions made by the computerized scorer. Note that this technique can be used in other environments as well, and is not limited to the present embodiments.

In some instances it may be necessary to solicit explicit ratings from the participants in advance to develop a profile, as is done with conventional recommendation systems. This data can be collected in any desired fashion by reference to items already known to the system, so that appropriate correlations can be developed for the participant in question. Since the identity of the items to be sampled is known in advance, the invention can exploit this knowledge to pick ratings items based on known correlations. Thus, if item X is correlated with enough data to item Y, and X is to be sampled at the event, the invention can solicit ratings for item Y to assist with the later predictions for X.

It can be seen that the information for the participants/teams/event can also be used by the invention to set up and determine the items to be sampled at any particular event. In other words by knowing what wines the participants have previously rated, it is possible to determine a correlated set that is likely to be of interest to the group participants. In other cases it may be desirable to develop new correlations between items, so the invention can suggest combinations of items intended to better flesh out an available data set, and thus increase overall system prediction accuracy. Stated another way, the matrix of participant ratings/items can be augmented with creative inducements to the hosts and participants, which in the long run should result in increased satisfaction from improved predictions and recommendations for participants/users.

At step 510, the host/participants of an event can elect to register and be included in a competitive ratings game. Registration is preferably on an event basis, but it is also possible for other forms of collective scoring, such as on a team basis (where a team is made up of a group of n or more participants) or on an individual basis. These different forms of registration also permit different types of ratings to be presented in different respective lists on the website of FIGS. 4A-4E for public review and entertainment. It is expected that this feature will promote participation in embodiments of the invention as well by appealing to the competitive streak in some participants.

It is expected that the computerized scorer will simply take the form of the recommendation engine such as described above in connection with steps 340 and 457. Since most conventional recommender systems must generate a prediction for a person before generating a recommendation, this fact can be exploited for a gaming purpose as set out herein. Thus this aspect of the present invention allows participants to see and observe the inner operations of a recommender system from an entertainment perspective and thus glean insights into their own tastes as well.

At step 520, ratings for the items are solicited in the same manner as described above. As part of this process, the participants can be informed in advance of what protocol will be used for the computerized scorer to guess their ratings. For example the event may be set up so that the participants are only told that the computerized scorer will be generating predictions randomly for only some of the items, or for only a single item as shown in box 525. Alternatively the participants may be told in advance which items the computerized scorer will be making predictions for, as shown in box 526.

Both options may be useful in different types of applications. The usefulness of a random option lies in the fact that it is less likely to result in a ratings bias which may occur as a result of participants trying to "game" the system by providing artificial ratings designed to maximize their score. If participants do not know in advance which item is being considered for the ratings match competition, they are less likely to provide adulterated ratings.

At step 530 the recommendations system (not shown) generates predictions for the participants in any conventional fashion, including by corroborative filtering, collaborative filtering, or some combination of the two. Other techniques known in the art can also be used. The prediction by the computerized scorer therefore is performed for one more of the items in the sample set used in the event.

After this the predictions by the computerized scorer and the ratings provided by the participants are compared on an item by item basis at step 540. The scoring noted above for comparing participant scores can be used here as well, such as by summing the square roots of the differences of the squares, or if desired, some other form of mathematical analysis can be done. In the end, a table can be created (not shown) correlating the performance of each of the participants against the computerized scorer for each item so evaluated. This table can be stored in an array or any other convenient form for manipulation, storage, etc.

During step 550 an overall event/team score is determined. This can be as simple again as summing the cumulative differences noted in step 540. This event/team data can be presented to the participants as part of the other scoring items noted above in connection with FIGS. 4C and 4D.

Note that to allow for better metrics and benchmarks, the competitive aspect of the invention may be tied or restricted to specific game kits (described above) having a known composition of item samples. For example a standard set of Chardonnays from 10 particular wineries may be used. This will promote better comparisons and evaluation of data since the item sets are less variable and thus better characterized across larger sample sizes.

Another beneficial side effect of this aspect of the invention is that it is likely to induce participants to provide more accurate and consistent scores for the items than prior art schemes, since the participant will know that such input will increase the odds that the computerized scorer will generate an accurate prediction for such person, and thus improve an overall team score. This symbiotic nuance makes the participant into a more of a cooperator with the system, in the sense that they will want their tastes to be discernible and understandable to the recommendation system. Thus it is expected that this positive inducement will result in more accurate ratings data being provided by the participants. Again this particular aspect of the invention is likely to have benefit in other domains.

At step 560 a competitive ratings database (not shown) is updated with the new scores from the event/team/participants in question. This database can mined as well for targeting marketing based on the likelihood that team members, or event participants, are likely to be associated with each other and have similar tastes in other products. For example it may be useful to treat the entire members of a team or an event as a single entity, and construct ratings matrices for such collections of individuals. This would allow predictions and recommendations to be served on higher order groupings—i.e. entities as opposed to individuals. Thus recommendations can be made on a team by team basis based on collective ratings. At the end of the event follow-ups can be made with targeted marketing and recommendations to such individuals and teams in the manner noted above for FIG. 3.

The individual/event/team ratings can be published on the aforementioned website in any convenient tabulated form as shown at step 570. For example, it might be desirable to list the highest performing individuals in aggregate, and then broken down according to wine type, and/or by geographic region. The same strategy could be used for events and collections of participants (teams) who elect to compete.

If desired, optional prizes could be awarded on a periodic basis at step 580, such as every week, every month, etc. Again the prizes may take any number of convenient forms, including coupons/discounts for the items in question or some other consideration. In some cases it may be useful to keep an ongoing top list of all participants/teams/events, and at the same time include a more contemporaneous or recent list to allow for fresh faces to receive recognition on a regular basis. This avoids the problem of some sites being dominated by the same persons and rendering the content somewhat stale.

It will be apparent to those skilled in the art that the present invention, including those aspects illustrated in FIGS. 1-5 can be implemented using any one of many known programming languages suitable for creating applications that can run on large scale computing systems, including servers connected to a network (such as the Internet). The details of the specific implementation of the present invention will vary depending on the programming language(s) used to embody the above principles, and are not material to an understanding of the present invention. Furthermore it will be apparent to those skilled in the art that this is not the entire set of software modules that can be used, or an exhaustive list of all operations executed by such modules. It is expected, in fact, that other features will be added by system operators in accordance with customer preferences and/or system performance requirements. Furthermore, while not explicitly shown or described herein, the details of the various software routines, executable code, etc., required to effectuate the functionality discussed above in such modules are not material to the present invention, and may be implemented in any number of ways known to those skilled in the art.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of conducting a sampling event for items, comprising:
    providing a first routine adapted to execute on one or more electronic data collection devices;
    collecting at least a set of individual user ratings for the set of items from a group of participants using said first routine executing on said one or more electronic data collection devices during the item sampling event;
    calculating item sampling event data for said group of participants, including at least item scores and participant scores, from the set of ratings using a second computing routine;
    providing at least some of said item sampling event data from said electronic data collection devices through a network to one or more electronic computing systems associated with third parties involved in one or more of the making, distributing, or selling of the items;
    sharing at least some of said item sampling event data, or metrics derived from said item sampling event data, with said group of participants with said first routine during a time period associated with the item sampling event; and
    transferring one or both of promotional coupons or other electronic feedback from such third parties over the network to said one or more electronic data collection devices or other electronic message accounts associated with said group of participants;
    wherein said promotional coupons or other electronic feedback are coupled to and dynamically adjustable by one or both of said second computing routine and said first computing routine based on one or both of a geographical location of said one or more data collection devices or a residence address of said group of participants.

2. The method of claim 1, wherein said item sampling event is identified by one or both of said first routine and said second routine to begin at a designated time and to extend for a designated period.

3. The method of claim 1, wherein participants can dynamically join an item sampling event in progress.

4. The method of claim 1, wherein one or more of said calculating step, said providing step, said sharing step, said transferring step and said receiving step are performed by a server computing device.

5. The method of claim 1, wherein said promotional electronic coupons are configured to be active for a participant only when he or she is detected within a first distance of one or more predetermined preferred establishments.

6. The method of claim 1, wherein opinions on second items distinct from the set of items used in the sampling event are also obtained from participants.

7. The method of claim 1, wherein said other electronic feedback includes audiovisual presentations describing the history/background of the item or the third party.

8. The method of claim 1, wherein said set of items comprises consumable items.

9. The method of claim 8, wherein said set of items comprises different wines.

10. A method of conducting a sampling event for items, comprising:
    collecting at least a set of ratings on each of a set of items from a group of participants using at least one first computing routine running on at least one electronic data collection device;
    calculating item sampling event data for the group of participants, including at least item scores and participant scores, using a second computing routine;
    correlating the item scores or participant scores for at least some of the group of participants with either or both of (1) item scores or participant scores of others of the group of participants or (2) rating predictions for the group of participants to create a set of correlated data using the second computing routine or a third computing routine;
    providing at least some of said item sampling event data from the at least one electronic data collection device through a network to one or more electronic computing systems associated with third parties involved in one or more of the making, distributing, or selling of the items;
    sharing at least some of the set of correlated data with the group of participants; and
    transferring coupons or promotional materials over a the network to the electronic data collection devices or to electronic message accounts associated with the group of participants, the coupons or promotional materials being based, at least in part, on the item sampling event data and being dynamically adjustable by one or more of the first, second or third computing routines based on the geographic locations or residence addresses of ones of the group of participants.

11. The method of claim 10, wherein the set of items is preselected.

12. The method of claim 11, wherein the identities of the members of the set of items are not shown to the group of participants at least until after said collecting.

13. The method of claim 10, wherein the group of participants is selected by an organizing member of the group of participants.

14. The method of claim 10, wherein said correlating comprises determining one or more of the following:
   a. which pair of participants provided the closest ratings results;
   b. which pair of participants provided the most disparate ratings results;
   c. which identified couple in the group provided the closest ratings data;
   d. which identified couple in the group provided the most disparate ratings data;
   e. a deviation from aggregate group scores on a participant by participant basis;
   f. one or more participants who subjectively gave the lowest rating to the item rated highest by the group;
   g. one or more participants who gave the highest rating to the item rated lowest by the group;
   h. one or more participants who gave the lowest rating to the item rated lowest by the group;
   i. one or more participants who gave the highest rating to the items rated highest by the group; and
   j. a score of each item broken down by sex or age groups.

15. The method of claim 10, wherein said collecting further comprises collecting a set of predictive ratings from at least some of the group of participants, each of the set of predictive ratings indicating what one of the group of participants predicts another of the group of participants' rating will be for at least one of the set of items.

16. The method of claim 10, wherein the sampling event begins at a designated time and extends for a designated period of time.

17. The method of claim 16, wherein said sharing occurs during the designated period of time.

18. A method of conducting a sampling event for items, comprising:
   selecting a set of items for a group of participants based on a set of predicted ratings using a recommendation engine running on a first computing system;
   collecting a least a set of ratings on each of the set of items from the group of participants using a first computing routine running on at least one electronic data collection device during the sampling event;
   calculating item sampling event data, including at least item scores and participant scores, using a second computing routine;
   providing at least some of the item sampling event data from the at least one electronic data collection device through a network to one or more electronic computing systems associated with third parties involved in one or more of the making, distributing, or selling of the items;
   correlating the item scores or participant scores for at least some of the group of participants with the predicted ratings for the group of participants to create a set of correlated data using the second computing routine or a third computing routine;
   sharing at least some of the set of correlated data with the group of participants using the first computing routine during a time period associated with the sampling event;
   transferring electronic coupons or electronic promotional materials through the network to the at least one electronic data collection device or to electronic message accounts associated with the group of participants, the coupons or promotional materials being based, at least in part, on the item sampling event data, and being dynamically adjustable by one or more of the first, second, or third computing routines based on the geographic locations of ones of the group of participants.

19. The method of claim 18, further comprising rewarding those of the group of participants whose item scores or participant scores correlate most closely with the set of predicted ratings.

20. The method of claim 18, further comprising collecting data from or about the group of participants sufficient to generate the set of predicted ratings prior to the sampling event.

* * * * *